(12) United States Patent
Persson

(10) Patent No.: US 8,798,641 B2
(45) Date of Patent: Aug. 5, 2014

(54) METHOD AND APPARATUS FOR LOCATION PREDICTION

(75) Inventor: Magnus Persson, Flyinge (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/132,516

(22) PCT Filed: Jun. 3, 2010

(86) PCT No.: PCT/EP2010/057761
§ 371 (c)(1),
(2), (4) Date: Nov. 14, 2011

(87) PCT Pub. No.: WO2011/150971
PCT Pub. Date: Dec. 8, 2011

(65) Prior Publication Data
US 2013/0072215 A1 Mar. 21, 2013

(51) Int. Cl.
*H04W 24/00* (2009.01)
(52) U.S. Cl.
USPC ........... 455/456.1; 455/456.2; 455/456.3; 455/456.4; 455/456.5; 455/456.6
(58) Field of Classification Search
USPC .......................... 455/456.1–456.6
See application file for complete search history.

(56) References Cited

U.S. PATENT DOCUMENTS

| 5,548,816 | A   | * | 8/1996  | DeVaney ............... 455/456.2 |
|-----------|-----|---|---------|----------------------------------|
| 6,539,393 | B1  | * | 3/2003  | Kabala ........................ 1/1 |
| 2004/0097242 | A1 | * | 5/2004  | Hull et al. ............... 455/456.1 |
| 2006/0025157 | A1 |   | 2/2006  | Kuwahara et al.                  |
| 2006/0156209 | A1 | * | 7/2006  | Matsuura et al. ........... 714/798 |
| 2006/0227744 | A1 | * | 10/2006 | Metke et al. ............... 370/331 |
| 2006/0293064 | A1 |   | 12/2006 | Robertson et al.                 |
| 2008/0070575 | A1 | * | 3/2008  | Claussen et al. ............ 455/436 |
| 2008/0134280 | A1 | * | 6/2008  | Kim ............................ 725/151 |
| 2008/0153512 | A1 | * | 6/2008  | Kale et al. ............... 455/456.3 |
| 2008/0293405 | A1 | * | 11/2008 | Meyer ..................... 455/432.1 |
| 2009/0291689 | A1 | * | 11/2009 | Negishi et al. ............. 455/436 |
| 2011/0159856 | A1 | * | 6/2011  | Walsh et al. ............. 455/414.2 |

OTHER PUBLICATIONS

International Search Report and Written Opinion dated Apr. 11, 2011 issued in corresponding EP application No. PCT/EP2010/057761, 11 pages.

\* cited by examiner

*Primary Examiner* — Nathan Mitchell
(74) *Attorney, Agent, or Firm* — Snyder, Clark, Lesch & Chung, LLP

(57) ABSTRACT

A location prediction device (300) and method for use thereof, configured to provide a location prediction (321) of a mobile device based on an adaptively compiled visitation history (315). The location prediction may be performed without the use of large amounts of system resources. The location prediction may be used in conjunction with any mobile device application known in the art.

15 Claims, 4 Drawing Sheets

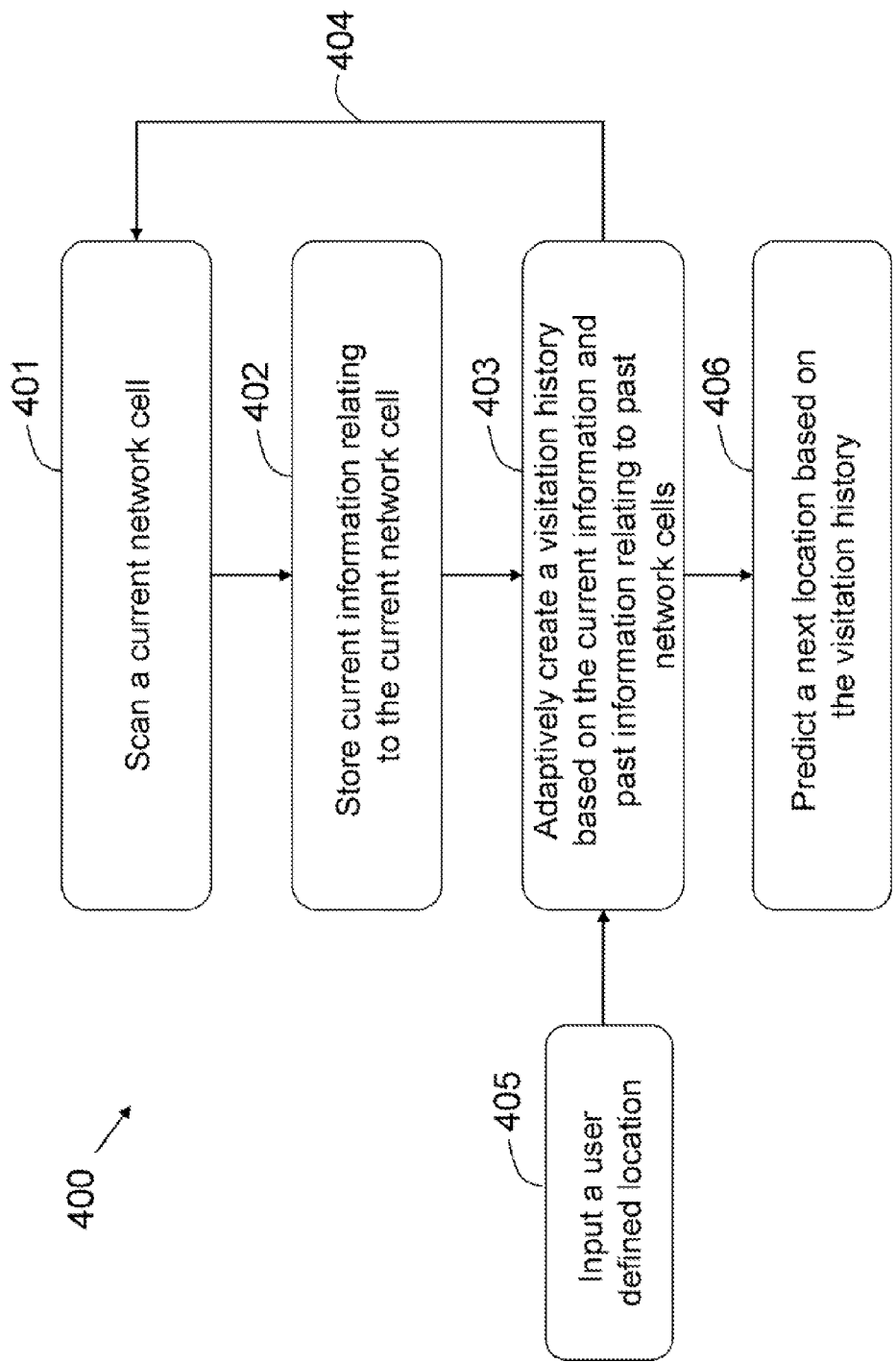

METHOD AND APPARATUS FOR LOCATION PREDICTION

TECHNICAL FIELD

A location prediction device for use in a mobile device, and corresponding method of location prediction, where a next location may be predicted based on a visitation history of a user or the mobile device.

BACKGROUND

Location analysis in mobile phones is typically performed by collecting location data once the mobile phone moves from one location to another. The collection of location data is performed with the use of Global Navigation Satellite System (GNSS), network based positioning methods, or Inertial Navigation Systems (INS). These methods may be used for the tracking and recording of all locations visited by the mobile device.

SUMMARY

Using GNNS and similar methods of tracking and recording of all locations visited by the mobile device requires a large amount of system resources and drains the battery life of the mobile device. Therefore, a solution is needed which provides accurate location prediction while relying on low amounts of system resources and utilizing low battery power.

Example embodiments presented herein comprise a location prediction device and a corresponding method of use. The location prediction device may comprise a scanning unit that may be configured to scan a current network cell. The device may also comprise a storage unit that may be configured to store current information relating to the current network cell. The device may further comprise a compiler that may be configured to adaptively create a visitation history based on the current information and past information relating to past network cells. The device may also comprise a processor that may be configured to provide a prediction of a next location based on the visitation history.

The compiler may further be configured to identify frequent network cells and frequent locations within the frequent network cells. The frequent network cells and frequent locations may be indentified based on, for example, a length of time of a visit and or a number of times of a visit. The compiler may also be configured to identify the frequent network cells and the frequent locations utilizing GPS information and or stored network information. The compiler may be further configured to input user defined location information.

The processor may be further configured to provide a user alert based on the prediction. The current and past information may include a cell identification and or may include operational characteristics.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 4 is a flow diagram of operational actions taken by the device of FIG. 3 according to example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

Location prediction is a useful tool which may be utilized by mobile device users. Location prediction may provide a mobile user with information regarding a location before the user arrives at the location. For example, based on a visitation history or pattern of a user, location prediction may be used to alert the user of any traffic delays that may have occurred in the path of the user's work commute. The location prediction may use the knowledge of the user's daily commute to provide any necessary updates. Furthermore, the location prediction may provide weather forecast reports based on the predicted locations of the user. The location prediction may also be used in association with any programs which provide reminders. For example, if the user has entered a reminder note to return a book from a library, the location prediction may alert the user to remember to bring the book if it is predicted the user may pass by the library. It should be appreciated that the examples highlighted above are merely examples and embodiments of location prediction may be used in conjunction with any type of mobile application known in the art.

Location prediction may be provided by tracking and detecting the various locations visited by a user. Typically mobile location detection involves the use of GPS analysis which requires large amounts of system and battery resources. In contrast, example embodiments are focused on the detection of network cells, rather than discrete locations. A network cell may define an area of mobile service coverage provided by a base station. A mobile device typically scans for the identity of its current network cell since this information is required when participating in wireless communications. Therefore, monitoring network cells for the use of location prediction does not utilize additional system resources and does not put further strain on the battery life of the mobile device, unlike detection methods which utilize GPS analysis for every discrete location visited by a user.

Figure 1:
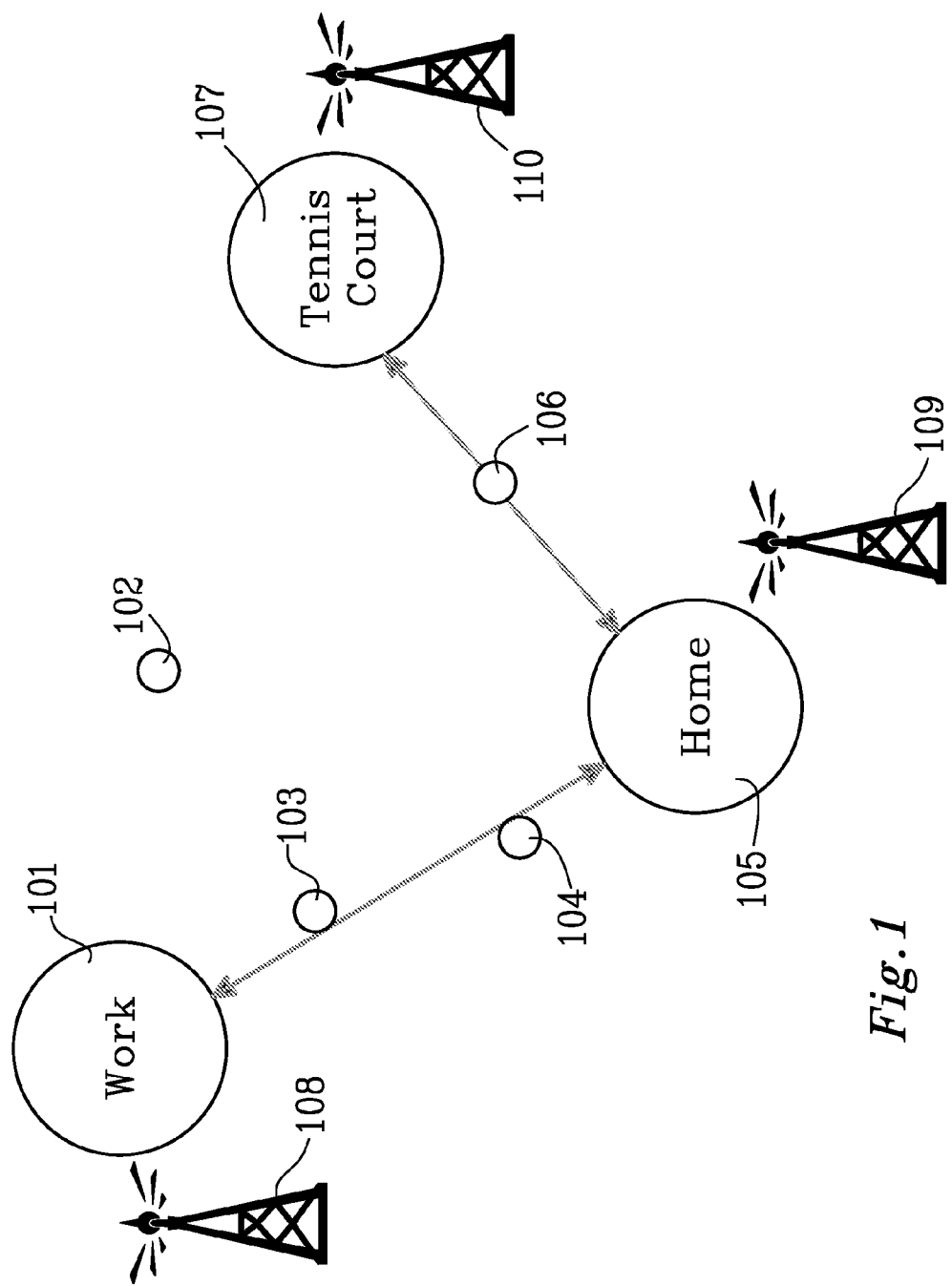
FIG. 1 is schematic of network cell detection according to example embodiments.

FIG. 1 provides an example of detected network cells. The highlighted areas 101 through 107 represent detected network cells that the user or mobile device has visited. The mobile device may be able to provide a rough estimation of the visited locations within a range of approximately 3 km. A mobile device may regularly scan for a current network cell (or the network cell which the mobile is currently situated in) as such information is utilized in mobile communications. Furthermore, the scanning unit of the mobile device may be notified by the network when changes in the serving network occur. Therefore, the mobile device may act as a listener rather than poll the network for the status of a current network. Thus, the scanning of network cells for the purpose of location prediction (through the use of listening or polling) does not require additional resources.

The network cells labeled 102, 103, 104, and 106 may represent cells which are not frequently visited by the mobile device or cells in which the user does not spend a large amount of time in. For example, network cell 102 may represent an area the user traveled to once to run an errand. Infrequent network cells such as 102, 103, 104, and 106 may not be highly relevant in the location visitation history of the user, or mobile device. Therefore, in order to reduce the amount of system resources utilized, example embodiments may remove the infrequent network cells from any additional scanning procedures.

The enlarged network cells 101, 105, and 107 represent frequently visited network cells or network cells in which the mobile device spends longer periods of time in. For example, a user may spend a majority of the time at his or her place of residence (illustrated by network cell 105), his or her place of employment (illustrated by network cell 101), or his or her place of recreation (illustrated by network cell 107). Network cells 101, 105, and 107 are defined by base stations 108, 109, and 110, respectively. The location prediction device may monitor the presence of frequently visited network cells as well as the visitation pattern of the frequently visited network cells.

Once the frequent network cells have been identified, the frequent network cells may also be chosen for further location evaluation in order to find a more precise location. Further evaluation may include the use of precise location techniques such as Global Navigation Satellite System (GNSS), network based positioning methods, or Inertial Navigation Systems (INS) to determine frequent locations within the frequent network cells. While the use of these methods require a greater amount of system resources and battery usage, since only the frequent network cells the amount of usage may be decreased. It should be appreciated that any method of location evaluation known in the art may be utilized in the further location evaluation step.

Figure 2:
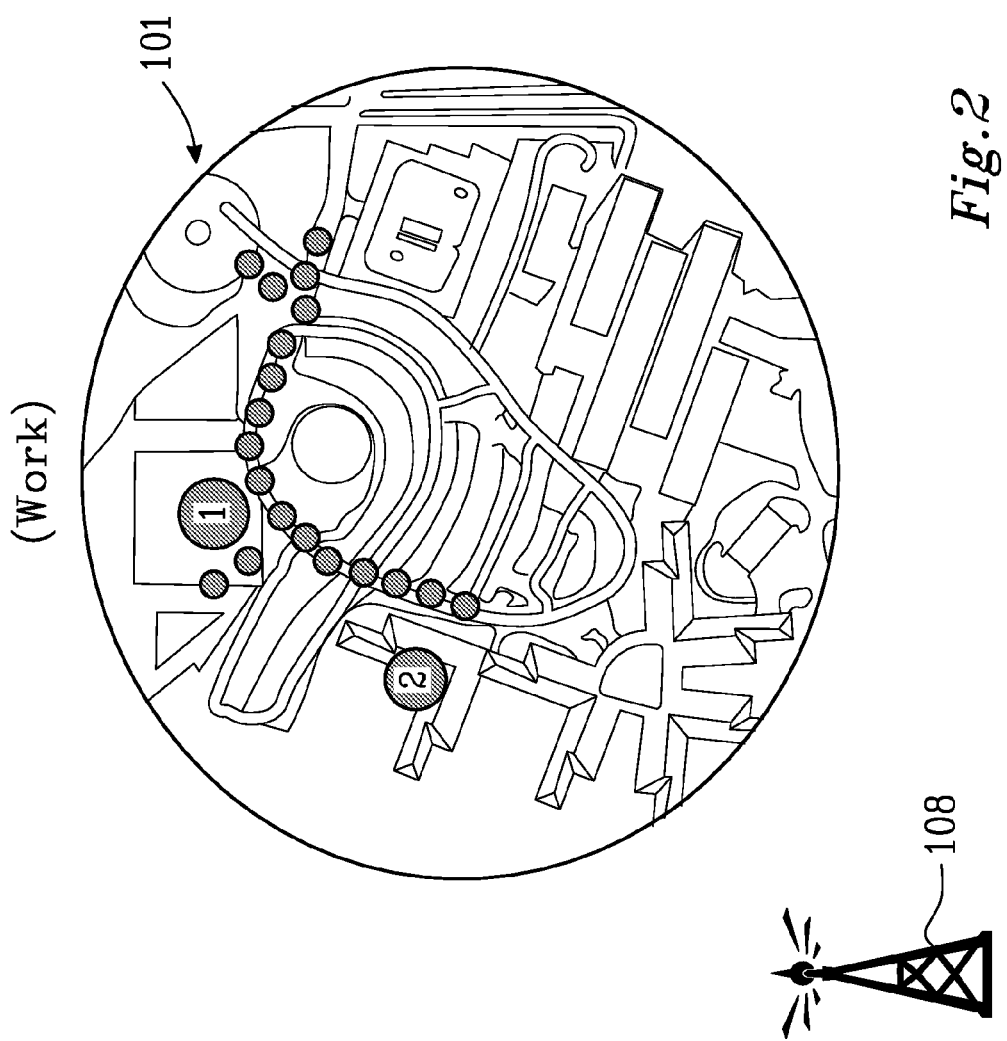
FIG. 2 is a schematic of location detection according to example embodiments.

In FIG. 2 an example of frequent location detection is provided. Using precise location techniques, the exact coordinates of the frequent locations visited by the user or mobile device may be indicated. In FIG. 2, the 'work' network cell 101 is provided as an example. The various darkened circles within the 'work' network cell 101 represents the various locations the user or mobile device has visited. The larger darkened circuits represent frequent locations which the user may have frequently visited or where the user spends a majority of his or her time. For example, the circle labeled as '1' may be the user's place of business and the circle labeled as '2' may be a restaurant the user frequently visits for lunch. The frequently visited locations and network cells may be input into a location prediction device to provide various types of updates or alerts which may be of benefit to the user.

Figure 3:
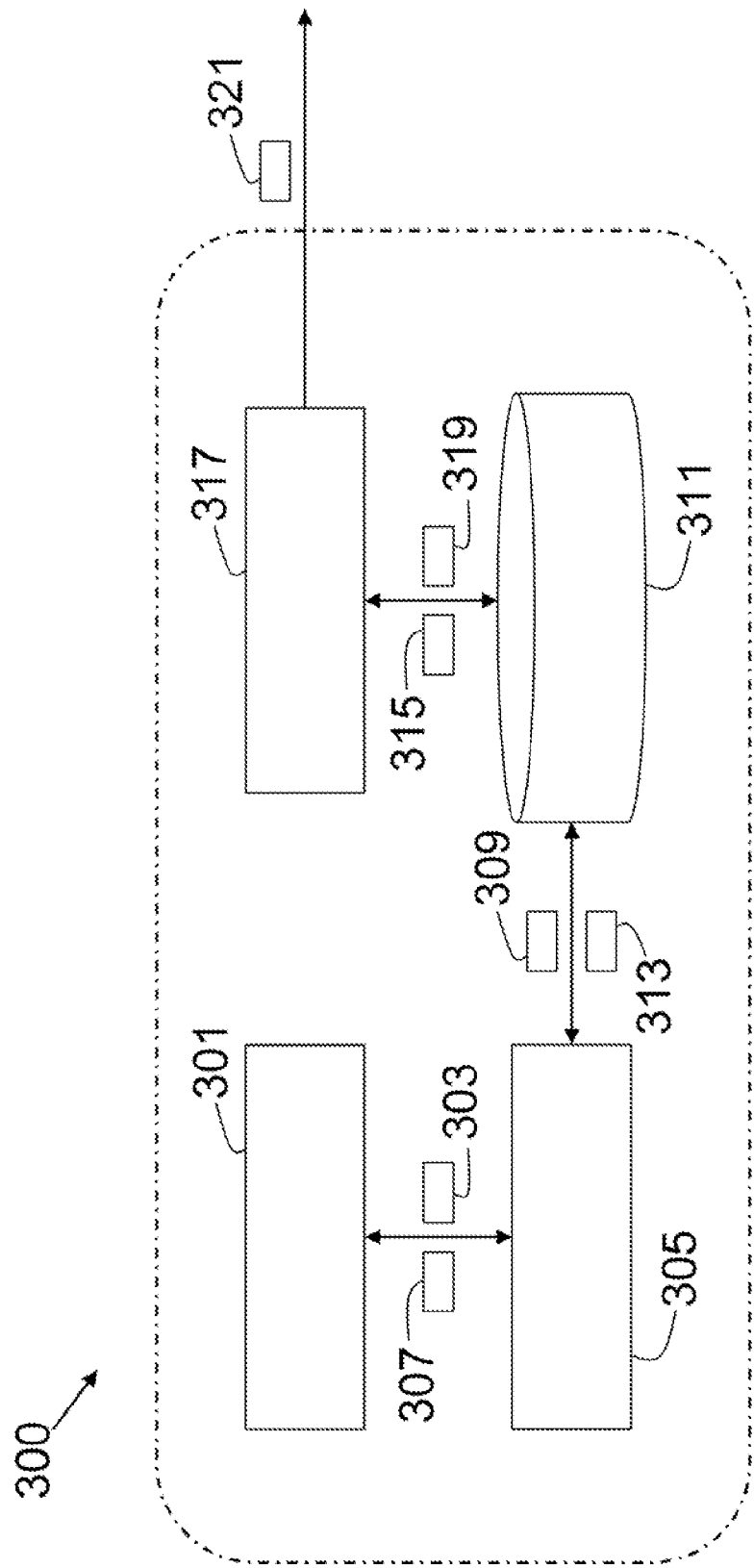
FIG. 3 is a block diagram of a location prediction device according to example embodiments.

FIG. 3 provides an example of a location detection device 300 and FIG. 4 provides a flow diagram 400 of example actions which may be taken by the location detection device of FIG. 3. The location detection device 300 may include a scanning unit 301 that may be configured to continuously scan for an identification of a current network cell, or the network cell which the mobile device is currently situated in (401). It should be appreciated that the scanning unit may be configured to receive a notification from the network that a change in the serving network has occurred. Therefore, the scanning unit 301 may be configured to operate in a polling mode and a listening mode. It should further be appreciated that the scanning unit 301 may be a part of any other component within the mobile device used for communications.

The scanning unit 301 may send scanned location information 303 to a storage unit 305 (402). The scanned location information 303 may include an identification of the scanned network cell, a time of the scanning, a duration of time for which the mobile device was situated in the scanned network cell, and any other operational characteristic known in the art.

The storage unit 305 may be configured to send an alert 307 to the scanning unit once a scanned network cell has been identified as a frequent network cell. The identification of a network cell as a frequent network cell may occur, for example, when a network cell has been visited over a predetermined number of times or for over a predetermined period of time. The predetermined number of visits or time duration may be a programmable value that may be altered by a user. Furthermore, it should be appreciated that different predetermined number of visits or time durations may be implemented for different times of the day (e.g., day time vs. night time mobility).

Once the scanning unit 301 has received the alert 307, additional searching, using GPS or network database searching, may be performed. The additional search location information, resulting from the GPS or database search, may also be sent to the storage unit 305. The storage unit may be configured to send frequent location and frequent network cell information 309 to a compiler 311.

The compiler 311 may be configured to adaptively create a visitation history of the mobile device based on the frequent location and frequent network cell information 309 (403). The creation of the visitation history may be based on current location or cell information and/or the creation may be based on past location or cell information which is stored in the storage unit 305. The compiler 311 may send an information request 313 to the storage unit 305 in order to request any other information necessary to compile the visitation history. It should be appreciated that the scanning (401), storing (402) and the visitation history creating (403) may occur continuously and adaptively (404). Furthermore, it should be appreciated that at any time, a user may input defined location information if, for example, the user deviates from his or her regular travel path and would like location prediction updates taking into account the deviation (405). The user input information may be provided through a number of applications such as for example a running navigation application or a geotagged calendar item. It should be appreciated that the user input information may be provided with the use of any input methods known in the art.

It should also be appreciated that the compiler 311 may be configured to retrieve network data when compiling the visitation history. Therefore, in some example embodiments, the storage unit 305 may be configured to store the current location information in the network. The compiler 311 may retrieve both the current location information and past location information from stored network data when compiling the visitation history.

Once the visitation history 315 has been compiled, the compiler may send the history to a processor 317. The processor may be configured to provide a location prediction of where the user or mobile device is likely to be situated in the future based on the visitation history 315 (406). In providing the location prediction, various methods for prediction and/or estimation may be utilized, for example, a Markov chain analysis. It should be appreciated that any prediction or estimation analysis known in the art may be employed. Furthermore, the processor 317 may be configured to send an information request to the compiler 311 should more information be required in providing the location prediction. It should be appreciated that the location prediction may be dependent on the various operational characteristics saved in the storage unit 305. For example, the location prediction may differ depending on what time and day of the week it is. Once the processor has provided a location prediction 321, the information may be sent or utilized by any other apparatus or application which may utilize the location prediction. Various alerts may be sent to the user based on the location prediction.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or a GNSS receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing descriptions of example embodiments have been presented for purposes of illustration and description. The foregoing description is not intended to be exhaustive or to limit the example embodiments to the precise form disclosed, and modifications and variations are possible in light of the above teachings or may be acquired from practice of various example embodiments. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A method for location prediction comprising:
scanning, by a mobile device, a current network cell with which the mobile device is communicating;
storing, by the mobile device, current information relating to the current network cell;
determining, by the mobile device, whether the current network cell is a frequent network cell;
determining, by the mobile device, a specific location of the mobile device within the current network cell only when it is determined that the current network cell is a frequent network cell;
storing, by the mobile device, specific location information relating to the specific location of the mobile device;
adaptively creating a visitation history based on the current information, past information relating to past network cells previously visited by the mobile device, and the specific location information; and
predicting a next location of the mobile device based on the visitation history.

2. The method of claim 1
identifying frequent locations within the frequent network cells based on the specific location information, wherein the identifying of the frequent network cells and frequent locations is a function of a length of time of a visit and/or a number of times of a visit.

3. The method of claim 2 wherein the step of identifying frequent locations further comprises utilizing Global Positioning System (GPS) information and/or stored network information.

4. The method of claim 1 wherein the step of adaptively creating the visitation history further comprises receiving, as input from a user, user defined location information.

5. The method of claim 1 wherein the current and past information includes a network cell identification.

6. The method of claim 1 wherein the current and past information includes operational characteristics.

7. The method of claim 1 further comprising providing a user alert based on the step of predicting.

8. A location prediction device comprising:
a scanning unit configured to scan a current network cell;
a storage unit configured to store current information relating to the current network cell with which the location prediction device is communicating;
a compiler configured to determine whether the current network cell is a frequent network cell,
wherein the compiler is further configured to determine a specific location of the mobile device within the current network cell only when it is determined that the current network cell is a frequent network cell,
wherein the storage unit is configured to store specific location information relating to the specific location of the mobile device, and
wherein the compiler is further configured to adaptively create a visitation history based on the current information, past information relating to past network cells, and the specific location information; and
a processor configured to provide a prediction of a next location based on the visitation history.

9. The device of claim 8 wherein the compiler is further configured to identify frequent locations within the frequent network cells, and wherein the compiler is configured to identify the frequent network cells and the frequent locations based on a length of time of a visit and/or a number of times of a visit.

10. The device of claim 9 wherein the compiler is further configured to identify the frequent network cells and the frequent locations utilizing Global Positioning System (GPS) information and/or stored network information.

11. The device of claim 8 wherein the compiler is further configured to receive, as input, user defined location information.

12. The device of claim 8 wherein the current information and the past information includes a network cell identification.

13. The device of claim 8 wherein the current information and the past information includes operational characteristics.

14. The device of claim 8 wherein the processor is further configured to provide a user alert based on the prediction.

15. A mobile communications apparatus comprising the location prediction device of claim 8.

* * * * *